US 6,581,099 B1

(12) United States Patent
Deen et al.

(10) Patent No.: US 6,581,099 B1
(45) Date of Patent: *Jun. 17, 2003

(54) ACCESSING SOURCES OF RESOURCES WITHIN STANDARD REQUEST-RESPONSE PROTOCOLS

(75) Inventors: Brian J. Deen, North Bend, WA (US); Saveen V. Reddy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,515

(22) Filed: Jul. 26, 1999

(51) Int. Cl.$^7$ .............................................. G06F 15/16

(52) U.S. Cl. ..................... 709/229; 709/203; 707/10; 707/14; 707/500

(58) Field of Search ................................. 709/203, 229; 707/10, 14, 500

(56) References Cited

U.S. PATENT DOCUMENTS

| | | | | |
|---|---|---|---|---|
| 5,956,483 A | * | 9/1999 | Grate et al. | 709/203 |
| 6,012,087 A | * | 1/2000 | Freivald et al. | 709/218 |
| 6,208,427 B1 | * | 3/2001 | Lee | 358/1.13 |
| 6,208,640 B1 | * | 3/2001 | Spell et al. | 370/358 |
| 6,253,217 B1 | * | 6/2001 | Dourish et al. | 707/500 |
| 6,332,127 B1 | * | 12/2001 | Bandera et al. | 705/14 |
| 6,351,748 B1 | * | 2/2002 | Deen et al. | 707/10 |
| 6,449,633 B1 | * | 9/2002 | Van et al. | 707/10 |

OTHER PUBLICATIONS

Dridi et al., "How To Implement Web-based Groupware Systems based on WebDAV", Proceeding of IEEE 8th International Conference, Jun. 16–18, 1999, pp. 114–119.*

E. James Whitehead, Jr., "WEBDAV: IRTF Standard For Collaborative Authoring On The Web", IEEE Internet Computing magazine, Sep.–Oct. issue, pp. 34–40.*

HTTP Working Group Internet Draft dated Nov. 18, 1998, prepared by Fielding, et al., available on the web site http://www.w3.org. [Chapter 1 is specifically provided].

W3C Recommendation REC–xml–1998–0210 dated Feb. 10, 1998, and available on the web site http://www.w3.org.

E. James Whitehead Jr., World–Wide–Web Distributed Authoring and Versioning (WebDAV): An Introduction, in StandardView, vol. 5, No. 1, Mar. 1997, pp. 3–8.

Internet Engineering Task Force (IETF) Request for Comment (RFC) 2518, entitled HTTP Extensions for Distributed Authoring, by Y. Goland, E. Whitehead, A. Faizi, S. Carter and D. Jensen, dated Feb. 1999.

ISO/IEC 9075:1992, Database Language SQL, Jul. 30, 1992, available from and produced by the International Organization for Standardization (ISO) in liason with the International Electrotechnical Commission (IEC), specifically the Joint Technical Committee ISO/IEC JTC1, Information Processing Systems. [Introduction is specifically provided].

(List continued on next page.)

Primary Examiner—Kenneth R. Coulter
Assistant Examiner—Hai V. Nguyen
(74) Attorney, Agent, or Firm—Workman, Nydegger & Seeley

(57) ABSTRACT

Access of sources of resources within standard request-response protocols such as HTTP is disclosed. In one embodiment, a method specifies a request for application against a resource, where the resource has a source and a response. Within a TRANSLATE header within the request, there is either a FALSE flag to indicate that the source is desired, or a TRUE flag to indicate that the response is desired. In one embodiment, the TRUE flag is the default for the TRANSLATE header. The request is output according to a predetermined request protocol such as HTTP, and in one embodiment, also according to a predetermined markup language such as XML.

18 Claims, 4 Drawing Sheets

OTHER PUBLICATIONS

Chris Date and Hugh Darwen, A Guide to the SQL Standard: A User's Guide to the Standard Database Language SQL, Apr. 1997, ISBN 0201964260.

Internet Web Site http://www.microsoft.com/data/oledb/, last updated Mar. 17, 1999.

Internet Web Site http://www.microsoft.com/data/oledb/oledb20/, printed Jul. 23, 1999.

Internet Web Site http://www.microsoft.com/com/, printed Jul. 23, 1999.

Internet Web Site http://www.microsoft.com/com/about.asp, printed Jul. 23, 1999.

Network Working Group Request for Comment (RFC) 1738 entitled Uniform Resource Locators (URL), by T. Berners-Lee, L. Masinter, M. McCahill, dated Dec. 1994.

Network Working Group Request for Comment (RFC) 2396 entitled Uniform Resource Identifiers (URI): Generic Syntax, by T. Berners-Lee, R. Fielding, L. Masinter, dated Aug. 1998.

* cited by examiner

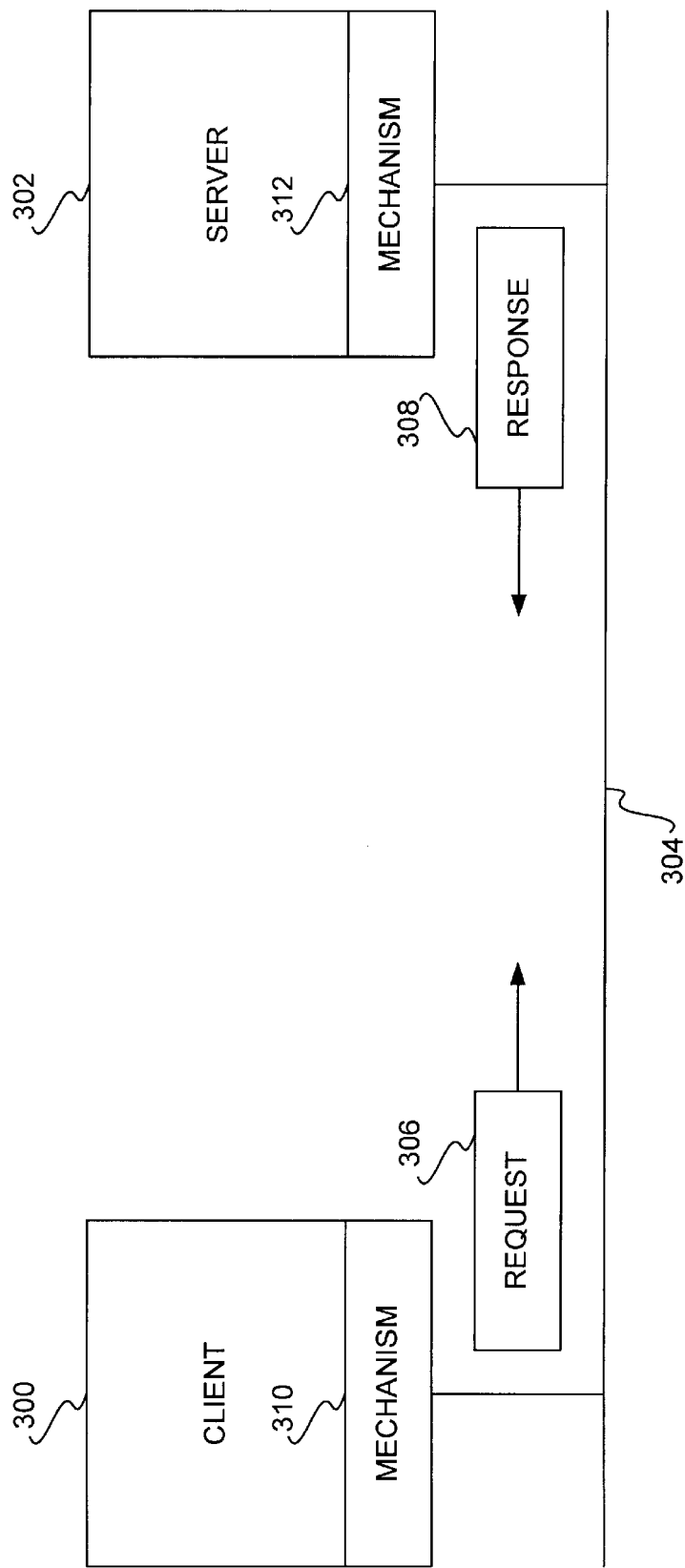

ACCESSING SOURCES OF RESOURCES WITHIN STANDARD REQUEST-RESPONSE PROTOCOLS

FIELD OF THE INVENTION

This invention relates generally to standard request-response protocols such as the HyperText Transport Protocol (HTTP), and more specifically to accessing sources of resources, such as files, according to such standard request-response protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the HTTP Working Group Internet Draft dated Nov. 18, 1998, prepared,by Fielding, et al., and available on the web site http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

HTTP, and hence XML in the context of HTTP, allows for the access of resources. The term resource refers to any piece of information that has a location described by a Uniform Resource Locator (URL) of the form HTTP://<domain>/<sub>/<resource>.<extension>, where <domain> specifies a particular domain, <sub> is a subdirectory, <resource> is a resource, and <extension> can be, for example, .com, .edu, and net, among others. A resource can be, for example, a Web page, a hierarchical collection of information such as folders, a document, a database, a bitmap image, or a computational object. Recently, extensions to HTTP have been proposed that, among other things, allow for better access to resources over HTTP. The extensions are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages.

WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. WEBDav is also described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. Generally, this latter reference specifies a set of methods, headers and content-types ancillary to HTTP/1.1 for the management of resource properties, creation and management of resource collections, name space manipulation, and resource locking (also referred to as collision avoidance).

A limitation to these extensions, and to HTTP generally, is that they do not allow access to a source of a resource, and instead only allow access to a response of the resource. In general, there are two different items addressed by an address known as a Uniform Resource Locator (URL) within HTTP: a response of a resource, and a source of the resource. The response of a resource generally refers to the response of the resource as returned by the resource's execution or access, while the source of a resource generally refers to the actual collection of bits that when run or accessed returns the response of the resource.

For example, accessing the URL http://server/sub/mypage.com returns a response, which is the response of this resource. Accessing this URL, more specifically, does not allow for the access of all the files stored at this URL, and which make up source of the resource. As another example, accessing the URL http://server/sub/foo.exe returns the response of this resource: the running of the program foo.exe. It does not return the program foo.exe itself; that is, it does not return the collection of bits that make up the program foo.exe. This deficiency in HTTP renders the protocol less useful as a mechanism by which to conduct distributed authoring. For example, a program such as foo.exe may only be run or executed via standard HTTP commands, such that a response is returned. The program cannot be itself easily configured, and thus cannot be easily modified or analyzed. For these and other reasons, there is a need for the present invention.

SUMMARY OF THE INVENTION

The invention provides for access of sources of resources within standard request-response protocols such as HTTP. In one embodiment, a method specifies a request for application against a resource, where the resource has a source and a response. Within a TRANSLATE header within the request, there is either a FALSE flag to indicate that the source is desired, or a TRUE flag to indicate that the response is desired. In one embodiment, the TRUE flag is the default for the TRANSLATE header; furthermore, if the TRANSLATE header is missing, it is assumed that the default is used. The request is output according to a predetermined request protocol such as HTTP, and in one embodiment, also according to a predetermined markup language such as XML. In one embodiment, the request is submitted by a client over a network, such as the Internet, an intranet, or an extranet, to a server.

In one embodiment, the server receives the request, and determines, if present, whether the TRANSLATE header specifies TRUE or FALSE. If the former (or if there is no TRANSLATE header), then the server generates and returns the response to the resource. However, if the latter, then the server determines whether an access source bit controlling access to the source of the resource is turned on. If it is, then the source can be accessed by the client; that is, in one embodiment, the source is returned. Otherwise, in one embodiment, an error message is returned to the client.

In another embodiment, access to the source is not given to the client until a second level of security is also checked, at the underlying file system level. In this embodiment, after it is determined that the access source bit for the source of the resource is turned on, it is determined whether a bit for the source at the underlying file system level is also turned on. If so, then access to the source by the client is permitted; that is, in one embodiment, the source is returned. Otherwise, in one embodiment, an error message is returned to the client.

The use of a TRANSLATE header provides embodiments of the invention with advantages not found in the prior art. Primarily, it allows for client access to and specification of the source of a resource, in addition to the response of the resource. For example, the source of a resource foo.exe can be accessed—that is, the collection of bits making up foo.exe—as well as the response of the resource—that is, the running of the program foo.exe. This ability to access both the source and the response of a resource renders HTTP a more useful protocol for distributed authoring of content, as compared to the prior art.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
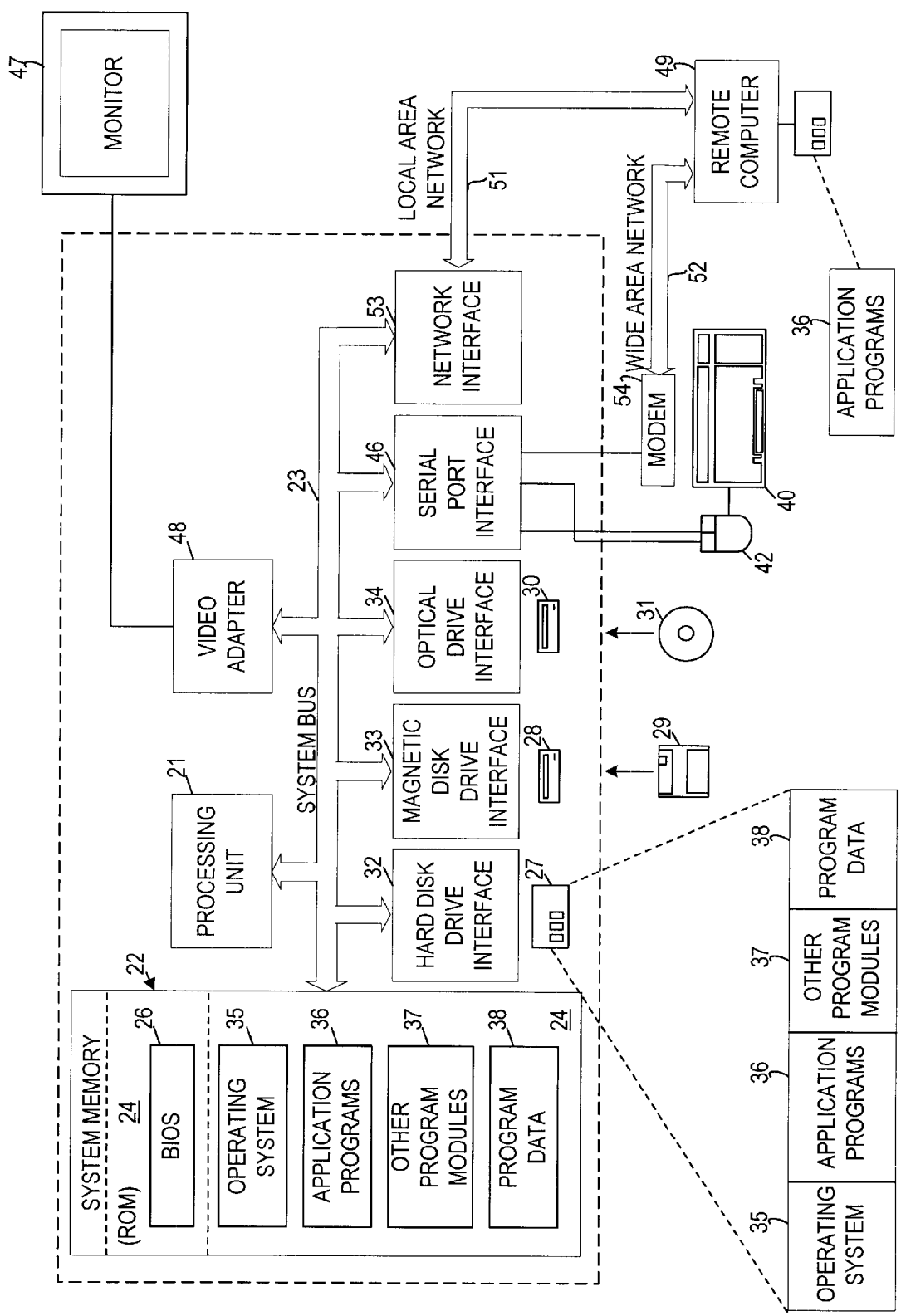
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Specifying a TRANSLATE Header Including a TRUE or FALSE Token

In this section of the detailed description, the manner by which a TRANSLATE header is specified, which includes a TRUE or a FALSE token, according to varying embodiments of the invention, is described. In further sections, methods, server architectures and systems according to embodiments of the invention are presented. The description is made in conjunction with the presentation of an illustrative example, according to XML and HTTP. While the example is specific to XML and HTTP, the invention is not so limited, and is applicable to any predetermined markup language and transport protocol. The example is:

<command>/<url>/HTTP/1.1

Content-Type: text/xml

Translate: T

In this example, there is an HTTP command <command> in the request. Such commands can include GET, PUT, etc., as known within the art. The command is against a target resource within a given space, referred to as a name space, and located at a given location. The location of the resource is specified by <url>. HTTP/1.1 specifies that the command is in accordance with the transport protocol HTTP, version 1.1. The Content Type of text/xml specifies that the command is in text format, according to the markup language XML. The resource's name is specified as the XML name space "mynamespace".

In addition, a TRANSLATE header is shown, to indicate whether the target resource should be translated or not—that is, whether a response of the resource should be returned, or a source of the resource. In the example, the TRUE token is specified. (It is noted, as used herein, that the TRUE token is inclusive of "t", "true," "T," "True," and "TRUE"—viz., the entire word TRUE does not have to be spelled out; the same is effective for the FALSE token.) This specifies that the response of the resource should be returned, as opposed to the source of the resource. If instead the FALSE token were specified, then the source of the resource would be returned, such that access thereto would be granted by the requesting client making the request, notwithstanding any access controls placed on the source, as described in succeeding sections of the detailed description.

As an example, if the target resource is an executable program, then this resource has a response defined by the execution or running of the program, and a source defined by the collection of bits that make up the program. The invention is not limited to a particular target resource, however, as can be appreciated by those of ordinary skill within the art.

Furthermore, in one embodiment, the TRANSLATE header has a default token of TRUE, to indicate that a response to a resource should be returned if neither the TRUE nor FALSE token is specified, or if the TRANSLATE header is itself not specified. This ensures backwards compatibility with HTTP, which does not provide for the TRANSLATE header, but does provide for the returning of responses of specified target resources.

Server Architecture

In this section of the detailed description, a server architecture according to varying embodiments of the invention is described. The server architecture shows the manner by which access to the source of a resource is controlled, when such access is requested, for example, by the sending of a request by a client to a server as described in the previous section of the detailed description. The invention is not limited to the server architecture described in this section, however. The description herein is made with reference to FIG. 3, which is a diagram of a server architecture according to one embodiment of the invention.

Figure 3:
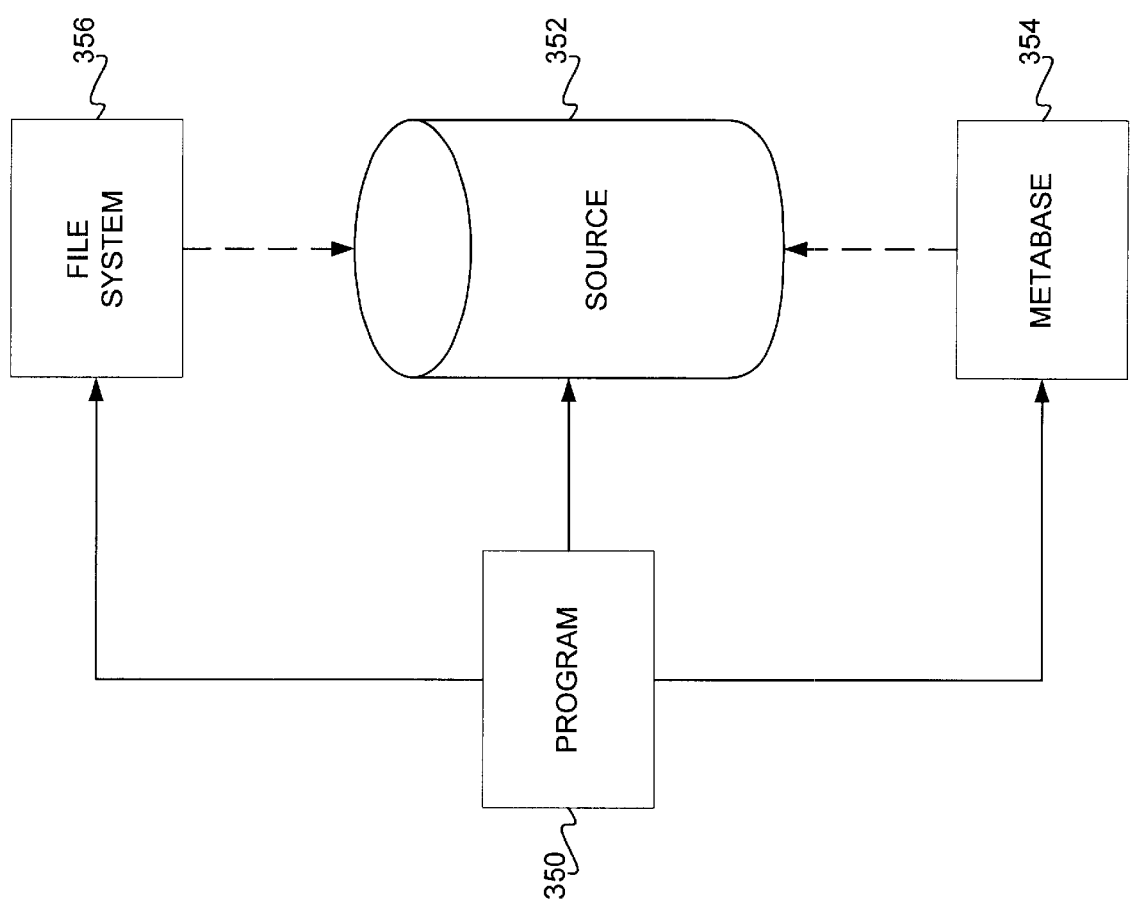
FIG. 3 is a diagram of a server architecture according to an embodiment of the invention; and, FIG. 4 is a diagram of a system according to an embodiment of the invention.

The server architecture of FIG. 3 includes a computer program 350, a source 352 of a resource, a metabase 354 storing information regarding the resource, and an underlying file system 356 storing information regarding the source of the resource. The computer program in one embodiment is executed by a processor from a computer-readable medium of a computer, such as that of FIG. 1 described elsewhere in the detailed description. The source 352 is in one embodiment a collection of bits, or data, stored on a computer-readable medium representing the source 352. The file system 356 and the metabase 354 are also in one embodiment data stored on a computer readable-medium representing the file system 356 and the metabase 354. The invention is not so limited, however.

In one embodiment, the program 350 determines whether a request to access the source 352 of the resource—for example, as specified in the previous section of the detailed description—is to be permitted by examining an access source bit and a file system level bit. If both of these bits are turned on, then access to the source 352 is permitted. If one or both of the bits are turned off, then access is not permitted. As will be explained in the next section of the detailed description, however, the invention is not limited to either or both bits as controlling access to the source 352 of the resource.

In one embodiment, the access source bit is a single bit, such that it is turned on by being set to a logical one, and is turned off by being set to a logical zero. The access source bit may be stored in a database referred to herein as a metabase, such as the metabase 354, which includes information about the resource. This database may also include other information regarding the resource, such as a read bit and a write bit regarding the resource, where the former indicates whether reading of the resource is permitted, while the latter indicates whether writing of the resource is permitted. Since the access source bit cannot itself be turned on if not at least one of the read and the write bits is turned on, it is said that the access source bit is additive with at least one of the read and the write bits, as can be understood by those of ordinary skill within the art.

In one embodiment, the file system level source bit is a single bit, such that it is turned on by being set to a logical one, and is turned off by being set to a logical zero. This bit may be stored in a database that is part of the file system, such as the file system 356, and which includes information about the source of the resource. This database may also include other information regarding the source of the resource, such as an Access Control List (ACL) of the source of the resource including a read bit and a write bit regarding the source, as known within the art, where the former indicates whether reading of the source is permitted, while the latter indicates whether writing of the source is permitted.

Thus, the program 350 accesses the metabase 354 for the access source bit for the resource having the source 352, and the file system 356 for the file system level bit for the source 352. The solid lines between the program 350 and the metabase 354 and 356 represent this access. The solid line between the program 350 and the source 352 indicates that the former controls access to the latter. The dotted lines between each of the file system 356 and the metabase 354 and the source 352 indicate that the former provides information regarding access control of the resource having the source 352, in the case of the metabase 354, or access control of the source 352, in the case of the file system 356.

Methods

In this section of the detailed description, methods according to varying embodiments of the invention are described. The description is made with reference to FIG. 2, which is a flowchart of a computer-implemented method according to one embodiment of the invention. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The methods relate to providing data types for properties according to standard request-response protocols such as HTTP.

Figure 2:
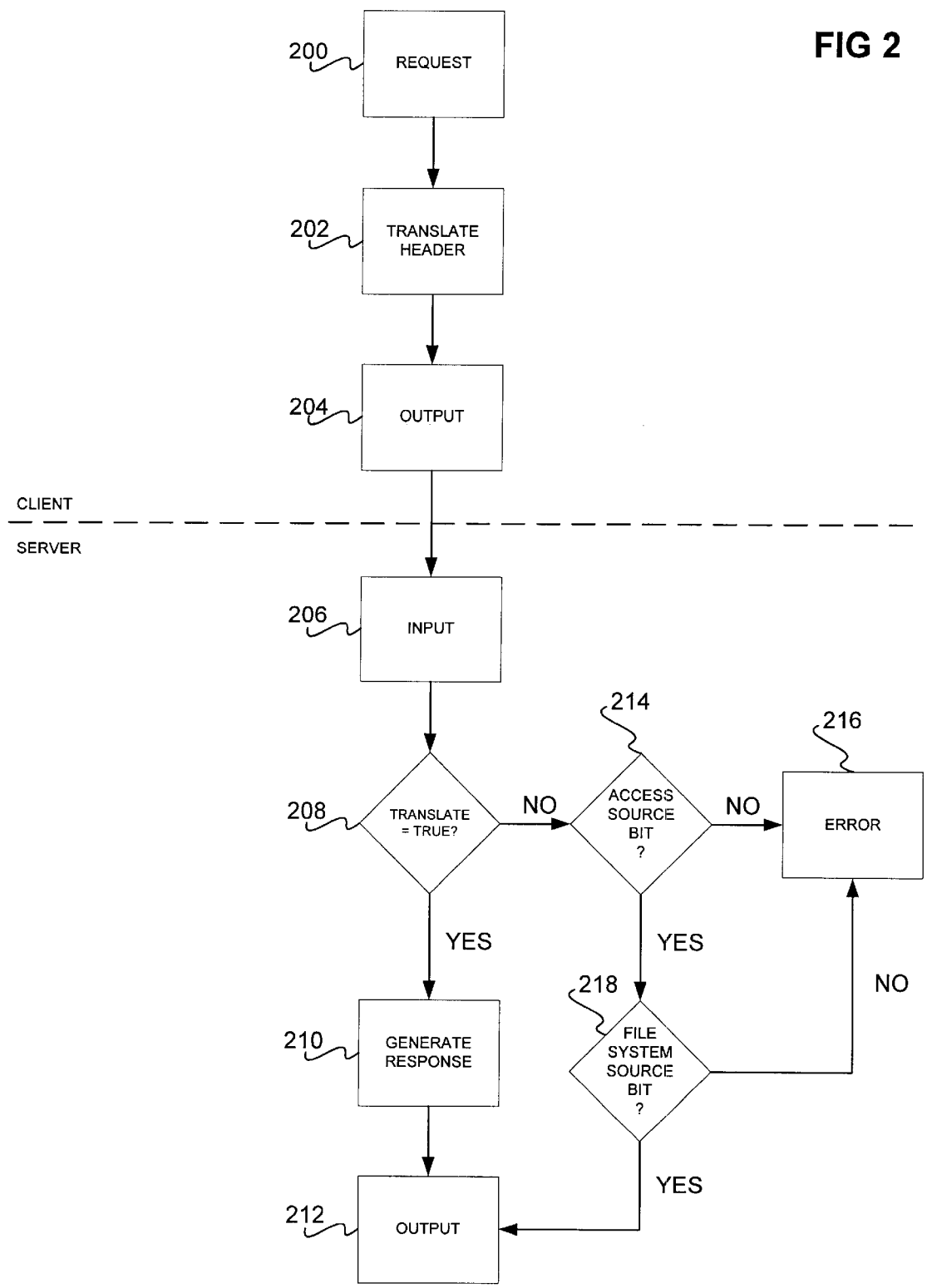
FIG. 2 is a flowchart of a method according to an embodiment of the invention.

It is noted that in FIG. 2, it is assumed that a TRANSLATE header is in fact included. However, in one embodiment of the invention, if the TRANSLATE header is not included, then the header is assumed to have a TRUE flag. That is, the TRANSLATE header with a TRUE token is assumed to be implicitly included. In other words, the omission of the TRANSLATE header and a corresponding TRUE or FALSE token defaults to a TRANSLATE header that specifies a TRUE token.

Referring now to FIG. 2, in 200, a request is specified, for example, by a client computer. In one embodiment, 200 includes actually generating the request. The request is specified for application against a target resource, which has a source and a response. In 202, a TRANSLATE header is specified with the request, including either a TRUE flag (also referred to as a token) or a FALSE flag (also referred to as a token), depending on whether the response of the resource, or the source of the resource, respectively, is wanted. If no TRANSLATE header is specified, then the TRUE flag is the default in one embodiment (that is, a Translate: True is assumed).

Finally, in 204, the request is output, according to a predetermined transport protocol. In one embodiment, the protocol is HTTP. The request may also be output according to a predetermined markup language. In one embodiment, the markup language is XML. As used herein, the phrase "according to" with respect to the transport protocol and/or the markup language refers to the request being per the transport protocol and the markup language. For example, the example described in the preceding section of the detailed description was in accordance with both HTTP and XML. Outputting a request can in one embodiment include the submitting of the request from a client to a server over a network, such as an intranet, the Internet, or an extranet.

Thus, the dotted line separating 200, 202 and 204 from the other parts of the method indicates that 200, 202 and 204 can be performed in one embodiment by a client computer. The other parts of the method, 206, 208, 210, 212, 214, 216, and 218, can be performed in one embodiment by a server computer. The client and the server computers are desirably communicatively coupled by a network, such as the Internet, an extranet, or an intranet, as known within the art.

In 206, the request is input, such as being received by a server computer from over the network. In 208, the method determines whether the TRANSLATE header specifies a TRUE token. If so, then in 210, a response to the request including the TRANSLATE header is generated, as known within the art, and the response is output in 212. Output in 212 can include, for example, the submission of the response from the server to the client over the network, according to a predetermined transport protocol such as HTTP and a predetermined markup language such as XML.

However, if in 208 the method determines that the TRANSLATE token specifies a FALSE token instead of a TRUE token, then in 214 it determines whether an access source bit for the source of the resource specified in the received request is turned on. The access source bit, as this term is used herein, generally refers to an access indicator of the source. If it is turned on, that is, if it is set to TRUE, then access to the source of the resource is permitted; otherwise, access to the source is not permitted.

In one embodiment, the access source bit is a single bit, such that it is turned on by being set to a logical one, and is turned off by being set to a logical zero. The access source bit may be stored in a database referred to herein as a metabase, which includes information about the resource. This database may also include other information regarding the resource, such as a read bit and a write bit regarding the resource, where the former indicates whether reading of the resource is permitted, while the latter indicates whether writing of the resource is permitted. Since the access source bit cannot itself be turned on if not at least one of the read and the write bits is turned on, it is said that the access source bit is additive with at least one of the read and the write bits, as can be understood by those of ordinary skill within the art.

Thus, if in 214 it is determined that the access source bit is turned off, then in 216 an error message is returned to the client, indicating that access is not permitted. If the access source bit is turned on, however, then in 218 the method determines whether a file system level source bit is also turned on. The file system level source bit, as the term is used herein, generally refers to an access indicator of the source at an underlying file-system level. For example, in one embodiment, the NT file system (NTFS) may be used, as known within the art.

The file system level source bit is separate from the access source bit. The former is maintained in one embodiment as part of general information regarding the resource itself, as stored in a metabase, and does not relate to the source of the resource as particularly stored consistent with a file system of a given operating system or architecture. Conversely, the latter is maintained in one embodiment as part of the underlying file system on which the source of the resource is particularly stored. For example, the access source bit may be turned on to indicate that access to the source is allowed, while the file system level source bit may nevertheless be turned off, indicating that even though the information regarding the resource indicates that access to the source of the resource is allowed, the file system itself in which the source is stored nevertheless does not permit access. Thus, in one embodiment, both the file system level source bit and the access source bit must be turned on to provide for access to the source of the resource.

In one embodiment, the file system level source bit is a single bit, such that it is turned on by being set to a logical one, and is turned off by being set to a logical zero. This bit may be stored in a database that is part of the file system and which includes information about the source of the resource. This database may also include other information regarding the source of the resource, such as an Access Control List (ACL) of the source of the resource including a read bit and a write bit regarding the source, as known within the art, where the former indicates whether reading of the source is permitted, while the latter indicates whether writing of the source is permitted. Since the file system level source bit cannot itself be turned on if not at least one of the file system level read and the write bits is turned on, it is said that the file system level source bit is additive with at least one of the file system level read and the write bits, as can be understood by those of ordinary skill within the art.

Thus, if in 218 it is determined that the access source bit is turned off, then in 216 an error message is returned to the client, indicating that access is not permitted. If the access source bit is turned on, however, then in 212 the source is returned, such that access to the source by the requesting client is permitted. The output in 212 of the source is in accordance with a predetermined transport protocol such as HTTP, and in accordance with a predetermined markup language such as XML. The output in 212 in one embodiment can be from the server to the client over a network, such as the Internet, an intranet, or an extranet.

In one embodiment, there is no file system level source bit controlling access to the source of the resource, such that if the access source bit is turned on in 214, then output is made in 212 such that access to the source by the requesting client is permitted. However, in the specific embodiment of FIG. 2, there is a file system level source bit also controlling access to the source of the resource, such that if the access source bit is turned on in 214, then the file system level source bit must also be turned on in 218 in order for output to be made in 212 such that access to the source by the requesting client is permitted. In other words, the invention itself is not particularly limited to the inclusion of a file system level source bit in addition to the access source bit. Furthermore, in one embodiment there is neither a file system level source bit nor an access source bit, such that once a request for access of a source of a resource is made, access thereto is always given.

System

In this section of the detailed description, a description of a system according to an embodiment of the invention is provided. The description is made with reference to FIG. 4. Referring now to FIG. 4, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled to the server 302 via a network 304, such as the Internet, an intranet, or an extranet.

The client 300 sends a request 306 according to a predetermined markup language such as XML and according to a predetermined transport protocol such as HTTP. In one embodiment, the request 306 is generated by an application or other computer program within the client 300 (not shown in FIG. 3), which is then passed onto the mechanism 310 for sending according to the markup language and the transport protocol. The mechanism 310 in one embodiment is a computer program executed by a processor of the client 300 from a computer-readable medium thereof. The request 306 is specified against a resource having a source and a response, and includes a TRANSLATE header having a TRUE or FALSE token to indicate that the response of the resource is wanted or the source of the resource is wanted, respectively, as has been described in the preceding sections of the detailed description.

In response to receipt of the request 306, the server 302 sends a response 308 according to a predetermined markup language such as XML and according to a predetermined transport protocol such as HTTP. In one embodiment, the response is generated by an application or other computer program within the server 302 (not shown in FIG. 3), which is then passed onto the mechanism 312 for sending according to the markup language and the transport protocol. The mechanism 312 in one embodiment is a computer program executed by a processor of the server 302 from a computer-readable medium thereof.

The response 308 is the response of the resource when the TRANSLATE header is TRUE (or, unspecified, or in the absence of the TRANSLATE header itself, in the case where TRANSLATE is TRUE is the default case). The response 308 is the source of the resource such that access thereto is permitted when the TRANSLATE header is FALSE, and, depending on the embodiment of the invention, whether the access source bit and/or the file system level source bit are turned on, as has been described in the previous sections of the detailed description. The response 308 is an error message indicating that access to the source of the resource is not permitted when the TRANSLATE header is FALSE, and depending on the embodiment of the invention, whether the access source bit and/or the file system level source bit are turned off, as has been described in the previous sections of the detailed description.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   specifying a request for application against a resource, the resource having a source and a response;
   specifying a TRANSLATE header with the request including one of a FALSE flag to indicate that the source is wanted and a TRUE flag to indicate that the response is wanted;
   outputting the request according to a predetermined transport protocol.

2. The method of claim 1, wherein the predetermined transport protocol comprises HTTP (HyperText Transport Protocol).

3. The method of claim 1, wherein the TRANSLATE header has a default flag comprising the TRUE flag.

4. The method of claim 1, wherein outputting the request comprises outputting the request further according to a predetermined markup language.

5. The method of claim 4, wherein the predetermined markup language comprises eXtensible Markup Language (XML).

6. The method of claim 1, wherein outputting the request comprises submitting the request from a client to a server over a network.

7. The method of claim 6, wherein the network comprises one of the Internet, an intranet, and an extranet.

8. The method of claim 6, further comprising receiving a response to the request by the client from the server over the network.

9. A machine-readable medium having instructions stored thereon for execution by a processor to perform a method comprising:
   generating a request at a client for application against a resource, the resource having a source and a response;
   specifying a TRANSLATE header with the request including one of a FALSE flag to indicate that the source is wanted and a TRUE flag to indicate that the response is wanted; and,
   submitting from the client the request according to a predetermined markup language and according to a predetermined transport protocol over a network.

10. The medium of claim 9, wherein the predetermined markup language comprises eXtensible Markup Language (XML), and the predetermined transport protocol comprises HyperText Transport Protocol (HTTP).

11. The medium of claim 9, wherein the network comprises one of the Internet, an intranet, and an extranet.

12. A machine-readable medium having instructions stored thereon for execution by a processor to perform a method comprising:
   receiving at a server a request for application against a resource, the resource having a source and a response, the request having a TRANSLATE header including one of a FALSE flag to indicate that the source is wanted and a TRUE flag to indicate that the response is wanted;
   determining at the server whether the TRANSLATE header includes the TRUE flag;
   upon determining that the TRANSLATE header includes the TRUE flag, generating the response at the server;
   submitting from the server one of the response and the source according to a predetermined markup language and according to a predetermined transport protocol over a network.

13. The medium of claim 12, wherein the predetermined markup language comprises eXtensible Markup Language (XML), and the predetermined transport protocol comprises HyperText Transport Protocol (HTTP).

14. The medium of claim 12, wherein the network comprises one of: the Internet, an intranet, and an extranet.

15. A computerized system comprising:
   a client to generate a request for application against a resource having a source and a response, to specify a TRANSLATE header with the request including one of a FALSE flag to indicate that the source is wanted and a TRUE flag to indicate that the response is wanted, and to send the request according to a predetermined markup language and according to a predetermined transport protocol; and,
   a server, communicatively coupled to the client, to generate a response to the request upon determining that the TRANSLATE header includes the TRUE flag, and to send one of the source and the response according to the predetermined markup language and according to the predetermined transport protocol.

16. The system of claim 15, wherein at least one of the server and the client comprise a computer-readable medium and a processor coupled thereto.

17. The system of claim 15, further comprising a network, such that the server is communicatively coupled to the client over the network.

18. The system of claim 15, wherein the predetermined markup language comprises extensible Markup Language (XML), and the predetermined transport protocol comprises HTTP (HyperText Transport Protocol).

* * * * *

UNITED STATES PATENT AND TRADEMARK OFFICE
CERTIFICATE OF CORRECTION

PATENT NO. : 6,581,099 B1
DATED : June 17, 2003
INVENTOR(S) : Deen et al.

It is certified that error appears in the above-identified patent and that said Letters Patent is hereby corrected as shown below:

Column 1,
Line 65, after "and" please delete "net" and insert -- .net --

Column 6,
Line 2, after "intranets and the" please delete "Internal" and insert -- Internet --

Column 12,
Line 26, after "one of" please insert -- : --

Signed and Sealed this

Eighth Day of June, 2004

JON W. DUDAS
*Acting Director of the United States Patent and Trademark Office*